United States Patent Office 3,730,948
Patented May 1, 1973

3,730,948
HEAT RESISTIVE RESIN COMPOSITIONS COMPRISING AN EPOXY, ORGANIC ACID ANHYDRIDE, AND MALEIMIDE
Keiiti Akiyama and Kiyoji Makino, Yokosuka, Japan, assignors to Tokyo Shibaura Electric Co., Ltd., Kawasaki-shi, Japan
No Drawing. Filed Mar. 22, 1971, Ser. No. 127,004
Claims priority, application Japan, May 13, 1970, 45/40,128
Int. Cl. C08g 30/14
U.S. Cl. 260—47 EC    4 Claims

ABSTRACT OF THE DISCLOSURE

Solventless composition used for heat resistive resin which is prepared by dissolving mutually a specific maleimide compound, a specific epoxy compound and a specific organic acid anhydride.

The mixing weight ratio of said maleimide compound, epoxy compound, and acid anhydride is respectively from 30 to 80%, from 10 to 35%, and from 10 to 35% on the basis of total mixture.

Heat resistive resin can be obtained by curing said composition at a temperature of from 100 to 200° C. for about from 10 to 100 minutes.

---

This invention relates to solventless liquid compositions used for a heat resistive cured resin.

As the so-called solventless resin composition does not contain any solvent, a step for removing the solvent by vaporization from the composition can be omitted, so that the preparing operation becomes simple when a cured resin is produced from said composition. Further, as these solventless resin compositions are usually in liquid state by themselves, they may be formed into dense insulators by such operations as impregnation or casting.

Among solventless resin compositions, a composition consisting of unsaturated polyester resin and styrene monomer, and that consisting of liquid epoxy resin and some kind of amine are well known. However, all resins from these compositions are not adequate in heat resistivity, and the resins would thermally decompose readily if they are left alone at a temperature of about 180° C. Accordingly, in case this kind of resin compositions are applied to the insulating constitution of electrical machineries or instruments of small size and large capacity, the resin derived from the compositions may deteriorate the quality thereof because such electrical machineries or instruments often heat while running, resulting in failing to function satisfactorily as the insulator.

An object of the present invention is to provide solvent-less liquid resin compositions for cured resins not only excellent in electric insulation and mechanical properties but also excellent in heat resistivity.

The object may be attained in accordance with the present invention by mixing and mutually dissolving a specific maleimide compound, a specific epoxy compound and a specific organic acid anhydride.

Maleimide, which is one component of the composition according to the present invention, has the chemical constitution represented by the following general formula,

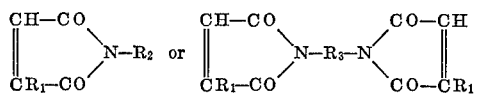

where:

$R_1$ is hydrogen radical or alkyl radical of $C_1$ to $C_4$;
$R_2$ is

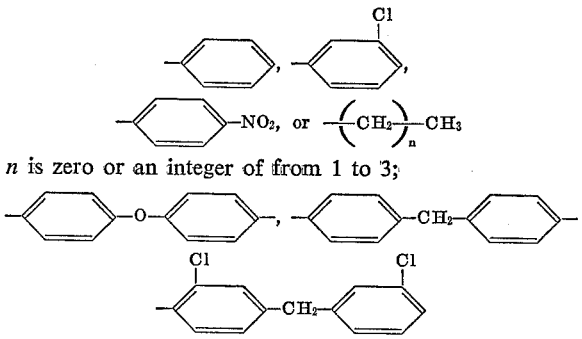

$n$ is zero or an integer of from 1 to 3;

As examples of said maleimide, there may be cited monomaleimide compounds such as N-phenylmaleimide, N-3-chlorophenylmaleimide, or N-4-nitrophenylmaleimide, and dimaleimide compounds such as 4,4'-methylenebis (N-phenylmaleimide), 4,4'-oxybis (N-phenylmaleimide), N,N'-sulfonbis (N-phenylmaleimide) or N,N'-dithiobis (N-phenylmaleimide). It is preferable to use for the component of maleimide a mixture consisting of at least two weight parts of dimaleimide and the remainder weight parts of monomaleimide on the base of 10 weight parts of the total maleimide. The reason is that monomaleimide serves to reduce the viscosity of the resin composition.

A suitable mixing ratio of maleimide compound for the resin composition is from 30 to 80% by weight on the basis of the total mixture, the remainder being a mixture of epoxy compound and acid anhydride. If this ratio is lower than 30%, the cured resin obtained from this composition would lose good heat resistivity. On the other hand, if the ratio exceeds 80%, the cured resin obtained from this composition gains good heat resistivity but decreases its mechanical strength.

Epoxy component, which is another component of the composition according to the present invention, has the chemical constitution represented by the following general formula,

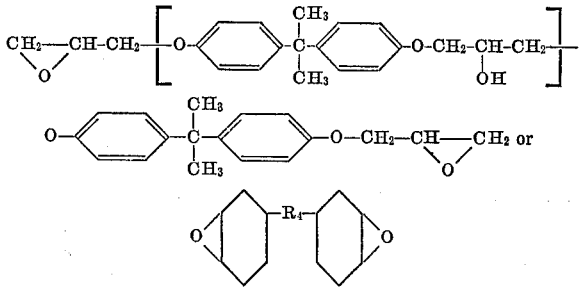

where:

$l$ is zero or an integer of 1 or 2; and
$R_4$ is

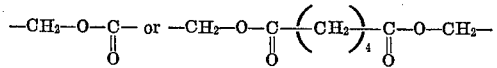

As examples of said epoxy compound, there may be cited epoxy resins of bisphenol type and cyclic aliphatic epoxy resins.

Organic acid anhydride, which is the other component of the composition according to the present invention, has the chemical constitution represented by the following general formula,

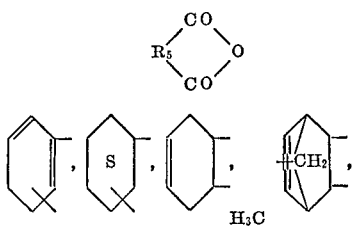

where: $R_5$ is
—CH=CH—, —CH$_2$—CH$_2$—,

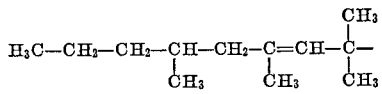

As examples of said acid anhydride, there may be cited hexahydrophthalic anhydride, dodecenyl succinic anhydride, maleic anhydride and phthalic anhydride.

As to the mixing weight ratio of the above-mentioned epoxy compound and acid anhydride, there is no rigid rule to obey, but it is generally desirable to make it approximately fifty to fifty by weight. Seven to two weight parts of this mixture is dissolved into the aforementioned maleimide compound to obtain ten weight parts of the resin composition.

The mixture of these three components is heated at a temperature of about 150° C. for about 20 minutes to dissolve mutually and homogeneously as a whole. Then this solution is cooled to obtain a liquid resin composition of low viscosity. It is desirable to add and dissolve an amine of some kind in a very small amount, that is, from 0.1 to 1.5% by weight on the basis of the composition, as a curing catalyst at a temperature of about 70° C. in the course of cooling.

When the resin composition of the present invention is cured, the curing reaction of the epoxy component is accelerated by the presence of the aforementioned organic acid anhydride. Simultaneously, part of the amine compound added as a curing catalyst participates in the additive reaction with maleimide compound and its curing reaction is accelerated. By this reason, the curing reaction proceeds faster than in the case of the curing reaction only by epoxy resin. For instance, it takes about 3 hours to cure at a temperature of 170° C. in the case of epoxy resin alone, but approximately 80 minutes at the same temperature in the case of compositions according to the present invention.

It is considered that the cured resin made of the compositions according to this invention does not only take a form of the mixture of polyimide polymer and cured epoxy resin, but a part of the resin composition turns into a copolymer of maleimide compound, epoxy compound, and acid anhydride thereby to contribute to the improvement of the heat resistivity of the cured resin.

Furthermore, the maleimide compound plays a role of solvent for epoxy compound and acid anhydride to provide solventless liquid resin compositions of low viscosity. It is thus very easy to perform an operation of impregnation or casting of these compositions.

The resin composition prepared in the above-mentioned manner does not contain ordinary solvent at all. When an article impregnated or casted with this composition in a proper form is cured at a temperature of from 100 to 200° C., the composition is fully hardened in a time of from 10 to 100 minutes. Thus cured resins have excellent electrical and mechanical properties as well as excellent heat resistivity incomparable to known solventless resins.

Examples of the present invention will be listed collectively as follows:

N-phenylmaleimide, N-3-chlorophenylmaleimide, N,N'-methylenebisphenylmaleimide, and N,N' - oxybisphenylmaleimide were selected as the maleimide compound; epoxy resin of bisphenol type

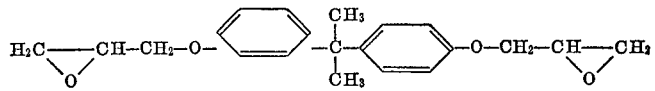

molecular weight thereof being about 350), and cyclic aliphatic epoxy resin

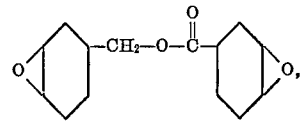

molecular weight thereof being about 250 as the epoxy compound; hexahydrophthalic anhydride, dodecenyl succinic anhydride, maleic anhydride, and phthalic anhydride as the acid anhydride; and xylylenediamine and benzyldimethylamine were used as catalyst respectively. In each case, three main components were mixed in the ratio (by weight part) shown in Table 1 and the mixture was heated at 150° C. for 20 minutes and mutually dissolved in perfectly homogeneous state. The solution obtained was thereafter cooled to 70° C. and the catalyst was added to dissolve into the solution, and the solution was finally cooled to room temperature to prepare the liquid resin composition. The viscosity at 70° C. of these compositions is shown in Table 1 respectively.

The electrical insulating resistance, dielectric loss tangent and heating weight loss of cured plate obtained by casting and the required curing time and temperature are also shown in Table 1. As seen from the table, the values of weight loss by heating are small in all cases and it will be apparent to everybody that the heat resistivity of these resins is adequate.

TABLE 1

| Components, etc. | Example | | | | | | | | |
|---|---|---|---|---|---|---|---|---|---|
| | 1 | 2 | 3 | 4 | 5 | 6 | 7 | 8 | 9 |
| N-phenylmaleimide | | | | | 20 | | 30 | | |
| N-3-chlorophenylmaleimide | | | | 20 | | 40 | 30 | | |
| N,N'-methylenebis (N-phenylmaleimide) | 10.0 | 100 | | 60 | | 60 | | 50 | |
| N-N'-oxybis (N-phenylmaleimide) | | | 100 | | | | 40 | 100 | 70 |
| Epoxy resin of bisphenolic type | 58.5 | 33 | 25 | 55 | 55 | | 58.5 | | 100 |
| Cyclic aliphatic epoxy resin | | | | | | | | 50 | |
| Hexahydrophthalic anhydride | 41.5 | | 20 | | | | | 50 | 100 |
| Dodecenyl succinic anhydride | | 37 | | | 60 | | | 110 | |
| Maleic anhydride | | | | | | 23 | | | |
| Phthalic anhydride | | | | | | | 41.5 | | |
| Xylylenediamine | | 3 | | | | | 3 | | 2 |
| Benzyldimethylamine | 1 | | 0.5 | 0.5 | 0.3 | | | 0.5 | 1 |
| Viscosity (70° C., poise) | 7 | 15 | 15 | 7 | 6 | 6 | 10 | 8 | 8 |
| Insulating resistance (200° C., Ω cm.) | 6×10¹¹ | 6×10¹¹ | 4×10¹¹ | 1×10¹¹ | 6×10¹¹ | 1×10¹¹ | 3×10¹¹ | 1×10¹¹ | 7×10¹⁰ |
| Dielectric loss tangent (200° C., percent) | 5.4 | 3.5 | 4.6 | 6.8 | 7.2 | 5.3 | 3.6 | 7.5 | 8.5 |
| Weight loss by heating (250° C., 300 hr., weight percent) | 9.5 | 7.4 | 6.8 | 10.5 | 8.3 | 10.2 | 8.4 | 10.2 | 11 |
| Required curing time (150° C., min.) | 8 | 77 | 20 | 30 | 45 | 86 | 32 | 18 | 96 |

What we claim is:
1. A solventless liquid composition used for a heat resistive cured resin which is prepared by dissolving an epoxy compound represented by the following general formulae selected from the group consisting of

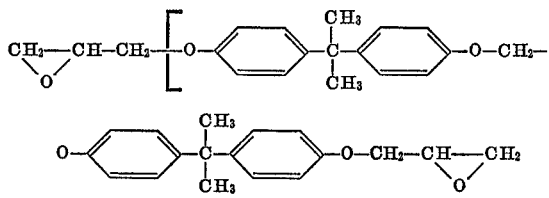

and

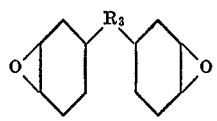

where:
$l$ is zero, 1 or 2; and
R is a radical selected from the group consisting of

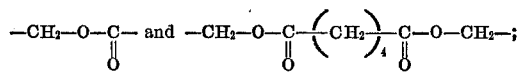

and an organic acid anhydride represented by the following general formula

where:
$R_5$ is a radical selected from the group consisting of

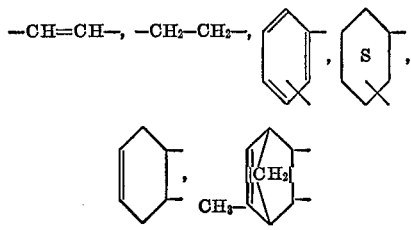

and

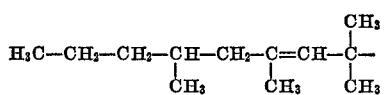

into a maleimide compound represented by the following general formulae selected from the group consisting of

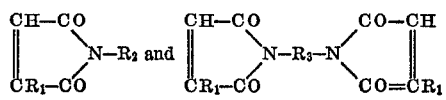

where:
$R_1$ is a radical selected from the group consisting of H and a $C_1$ to $C_4$ alkyl group;

$R_2$ is a radical selected from the group consisting of

and $\text{-(CH}_2\text{)}_n\text{CH}_3$;
$n$ is zero or an integer of from 1 to 3; and
$R_3$ is a radical selected from the group consisting of

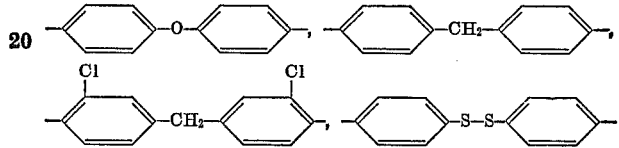

and

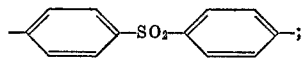

wherein the mixing ratio of the components is from 30 to 80 weight percent of said maleimide compound, which is a mixture of at least 2 parts by weight of dimaleimide with the remainder monomaleimide on the basis of 10 weight parts of total maleimide, based upon the weight of total mixture, and the remainder is a mixture of said epoxy compound and said acid anhydride, whose mixing ratio is approximately half-and-half by weight.

2. The solventless liquid composition according to claim 1 wherein the three components are dissolved mutually at a temperature of about 150° C. for about 20 minutes, and then cooled to a room temperature to obtain a liquid composition.

3. The solventless liquid composition according to claim 1 wherein an amine compound, the amount of which is from 0.1 to 1.5 weight percent on the basis of the total weight of the composition, is dissolved in the liquid composition as a curing catalyst at a temperature of about 70° C.

4. The solventless liquid composition according to claim 3 wherein the amine compound is xylylenediamine or benzyldimethylamine.

References Cited
UNITED STATES PATENTS 3,379,685  4/1968  Preininger et al. __ 260—47 EN
3,429,947  2/1969  Van Eygen _____ 260—2 EC WILLIAM H. SHORT, Primary Examiner
T. E. PERTILLA, Assistant Examiner U.S. Cl. X.R.
117—127; 260—ZEC, 30.2, 786 A, 78.4 EP, 830, 836